United States Patent [19]

Popov et al.

[11] 4,287,444

[45] Sep. 1, 1981

[54] CYLINDRICAL LINEAR INDUCTION MOTOR

[76] Inventors: Alexandr D. Popov, prospekt Koroleva, 12, kv. 154; Vladimir A. Solomin, ulitsa Dachnaya, 14, kv. 31; Nikolai R. Teptikov, ulitsa petrashevskogo, 48/23, kv. 57; Jury D. Demchenko, ulitsa Verkhne-Nolnaya, 9, kv. 12, all of Rostov-na-Donu, U.S.S.R.

[21] Appl. No.: 123,958

[22] Filed: Feb. 25, 1980

[51] Int. Cl.³ .......................................... H02K 41/02
[52] U.S. Cl. .................................. 310/13; 318/135; 417/50
[58] Field of Search ................. 310/11, 12–14; 417/50; 318/135

[56] References Cited
U.S. PATENT DOCUMENTS

| | | | |
|---|---|---|---|
| 3,005,116 | 10/1961 | Reece | 310/11 |
| 3,135,879 | 6/1964 | Baumann | 310/13 |
| 3,148,292 | 9/1964 | Bergslieu et al. | 310/13 |
| 3,155,851 | 11/1964 | Francis | 310/13 |
| 3,543,060 | 11/1970 | Holmes et al. | 310/13 |
| 3,602,745 | 8/1971 | Davis | 310/13 |
| 3,852,627 | 12/1974 | Davis | 310/13 |
| 3,987,321 | 10/1976 | Wilhelmi | 310/13 |

*Primary Examiner*—Donovan F. Duggan
*Attorney, Agent, or Firm*—Robert E. Burns; Bruce L. Adams

[57] ABSTRACT

A cylindrical linear induction motor comprises an inductor having a laminated core structure formed of individual circular cores with slots adapted to receive a polyphase winding. The slots receiving the polyphase winding are arranged uniformly on the internal surface of the cores, one core being disposed with respect to the other so that the slots for like phases of the winding are displaced over a distance equal to or greater than the distance between the contiguous slots of one core.

4 Claims, 4 Drawing Figures

CYLINDRICAL LINEAR INDUCTION MOTOR

Field of the Invention

The invention relates to electrical induction machines, and more particularly to cylindrical linear induction motors.

The motor of the invention is suitable for pumping and mixing an electrically conductive liquid or two varieties thereof, particularly liquid metals. Other uses are concerned with drive means for drilling and boring installations, and also with the manufacture of large-diameter strip-steel pipes. Provision is made for controlling the traction force produced by the motor.

PRIOR ART

Known in the art is a cylindrical linear induction electric motor comprising an inductor with a polyphase winding and a secondary element fabricated from an electrically conductive material and surrounded by the inductor (cf. British Pat. No. 1,240,473, Cl. H2A filed in 1971). In the aforesaid motor the magnetizing force of the polyphase winding sets up a magnetic field travelling along the motor axis, which interacts with the secondary element, thereby producing a force causing the latter to perform a progressive motion along the axis thereof.

A disadvantage of such a motor is that its secondary element performs no rotary motion since the inductor and polyphase winding allow producing only a translatory magnetic field. In the motor, it is impossible to control its truction force and therefore the translatory motion of the secondary element.

Another cylindrical linear induction motor (cf. the USSR Inventor's Certificate No. 64,141, Cl.HO2K 17/02) comprises an inductor having a laminated core structure formed of individual cores with slots adapted to receive a polyphase winding, and a secondary element fabricated from an electrically conductive material and surrounded by the inductor. In the aforesaid motor the laminations comprised in the inductor structure represent individual segments interconnected by means of ferromagnetic couplers.

Such an induction motor allows progressive motion of the secondary element and, at the same time, its rotary motion. The magnetizing force of the inductor polyphase winding produces both rectilinear and rotary magnetic fields. The interaction of these fields with the secondary element causes it to perform a screw-like motion.

It should be noted that, in view of the fact that in the known motor the laminations comprised in the inductor structure represent segments forming an open magnetic circuit, the area within which there occurs the active interaction between the inductor and the secondary element is comparatively small whereby the forces developed by the motor are also small.

Moreover, the cores in the form of segments are constructionally intricate.

SUMMARY OF THE INVENTION

It is an object of the invention to enhance interaction between an inductor and a secondary element.

Another object of the invention is to simplify the construction of an inductor of a cylindrical linear induction motor.

A still another object of the invention is to reduce material expenditure for an inductor polyphase winding.

Another object of the invention is to provide for a possibility of controlling the traction force of the motor in an axial direction thereof.

Yet another object of the invention is to provide for a possibility of concurrent pumping and mixing of two electrically conducting liquids, said pumping being carried out in two opposite directions.

The foregoing objects are attained by that in a cylindrical linear induction motor comprising an inductor having a laminated core structure formed of individual cores with slots adapted to receive a polyphase winding, and a secondary element fabricated from an electrically conductive material and surrounded by the inductor, each core, according to the invention, has a circular configuration and the slots receiving the polyphase winding are arranged uniformly on the internal surface thereof, one core being disposed with respect to another one of said cores so that the slots for like phases of winding are displaced over a distance equal to or greater than the distance between the contiguous slots of one core.

Preferably, a polyphase winding should be composed of individual sections having rectilinear portions contained within the slots of the circular cores, and also having couplers interconnecting said portions.

Advantageously, the motor should comprise a control system adapted to control its traction force and including identical driven gearwheels sitting on respective ones of said circular cores, except a core belonging to the outermost cores, intermediate gearwheels cooperating with said driven gearwheels, driving gearwheels sitting on a single shaft and cooperating with the intermediate gearwheels, and a step motor adapted to drive said driving gearwheels, the diameters of the latter being related to one another as the numerals included in a natural numerical series, beginning with unity, and the diameter of the driving gearwheel cooperating with the driven gearwheel sitting on the core juxtaposed to said outermost core being selected to be equal to unity.

Preferably, the motor should comprise a secondary element implemented in the form of two different electrically conductive liquids contained in a cylindrical shell made of a non-magnetic dielectric material and provided with a diametrically arranged partition which is adapted to form two cavities for respective ones of said liquids, a polyphase winding having two winding portions, one of said winding portions contained in the slots of said circular cores, which are juxtaposed to the external surface of one of the cavities of the cylindrical shell, being adapted to provide for a direct order of phase sequence as related to each of said cores and to the axis of motor, the other winding portion contained in the slots of the cores, which are juxtaposed to the external surface of the other cavity of the cylindrical shell being adapted to provide for a reverse order of phase sequence as related to each of the cores and to the axis of the motor.

An advantage of the hereinproposed cylindrical linear induction motor over the prior art is a larger area within which the interaction between an inductor and a secondary element is active with the dimensions thereof being the same. Due to an enhanced interaction between the inductor and the secondary element in pumping liquid metal, the motor power is increased as compared with the known motors. Furthermore, the amount of liquids being pumped per unit time is increased, another advantage being that the mixing of such liquids is improved without the use of any special facilities. With a single inductor and a single secondary element, it is possible to pump two different electrically conductive liquids and to mix each of them without any auxiliary means, with the result that material expenditure is decreased and compactness of the motor is increased. Increased axial forces in boring and drilling installations make it possible to expedite the process of drilling and cutting bore holes. Greater functional capabilities of the motor are attained due to the traction force control system which enables materials of differing hardness and structure to be processed.

The inductor construction is simple, a feature facilitating fabrication and maintenance. The proposed polyphase winding permits reducing expenditure of electrically conductive materials.

DESCRIPTION OF THE DRAWINGS

The invention will now be described in greater detail with reference to specific embodiments thereof, taken in conjunction with the accompanying drawings, wherein.

DESCRIPTION OF THE INVENTION

Figure 1:
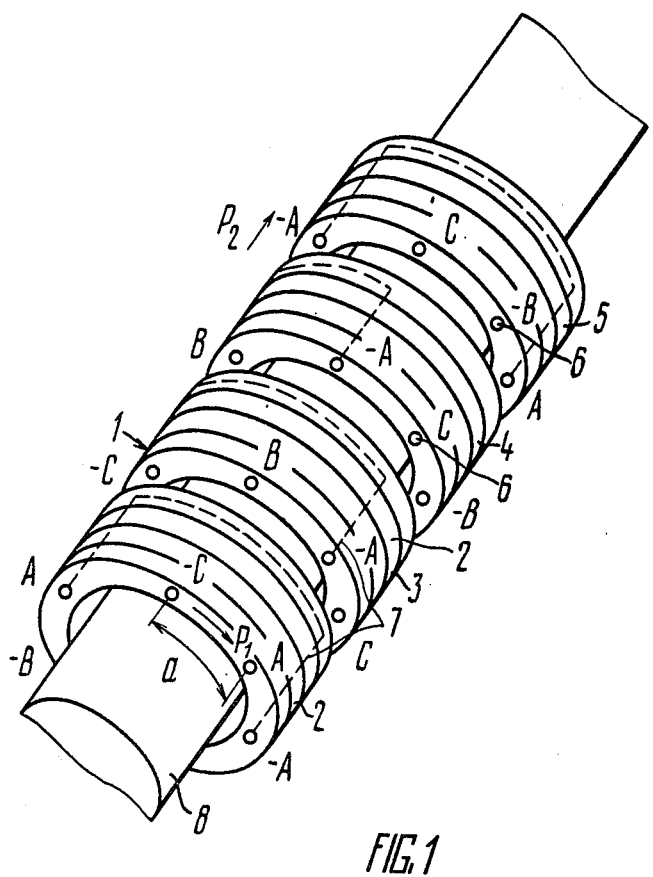
FIG. 1 is a general view in perspective of a cylindrical linear induction motor, according to the invention.

The motor of the invention comprises an inductor 1 (FIG. 1) having a laminated core structure formed of individual cores 2, 3, 4, 5 with slots 6 adapted to receive a polyphase winding 7. The number of circular cores 2,3,4,5 of the inductor 1 depends on the number of phases of the polyphase winding 7, on the number of poles and other factors and may differ from that shown in FIG. 1 in other versions of the motor of the invention. In accordance with conventional electrical machinery practice the slots 6 are shown within the cores 2,3,4,5 diagrammatically. The letters A,B,C denote respective phases of the polyphase (specifically, three-phase) winding 7. In FIG. 1 the phase A of the polyphase winding 7 is shown with a dashed line.

The motor of the invention also includes a secondary element 8 fabricated from an electrically conductive material and surrounded by the inductor 1. In the preferred embodiment of the invention the secondary element 8 is an aluminum rod which may be connected to a boring or drilling installation.

The laminated cores 2,3,4,5 have a circular configuration and the slots 6 receiving the polyphase winding 7 are arranged uniformly on the internal surface within a distance "a" from one another. One core of said cores 2,3,4,5 is disposed with respect to another so that the slots 6 for like phases of the winding 7 are displaced over a distance equal to or greater than the distance "a" between the contiguous slots 6.

The proposed construction of the cores 2,3,4,5 and arrangement therein of the polyphase winding 7 permit a direct phase sequence along the motor axis: A,−C, B,−A, C,−B, −C,B, −A,C, −B,A and so forth.

In the preferred embodiment of the motor, the polyphase winding 7 is composed of individual windings of each of the cores 2,3,4,5, parallel-connected to a power line.

Figure 2:
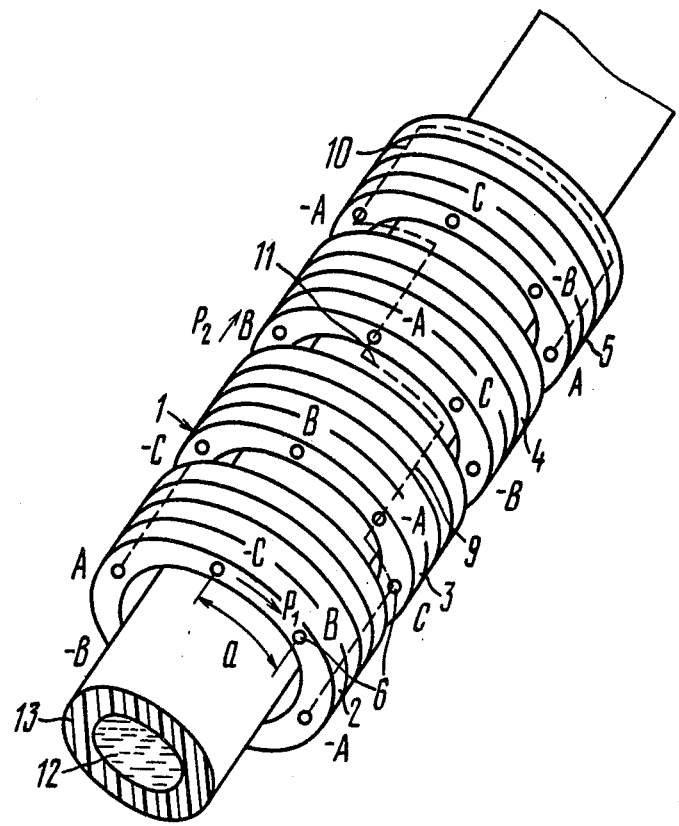
FIG. 2 is a general view in perspective of a cylindrical linear induction motor with a polyphase winding implemented in the form of sections, according to the invention.

A polyphase winding 9 (FIG. 2) of the inductor 1 of the motor of the invention is composed of individual stepped sections having rectilinear portions 10 contained within the slots 3 of the circular cores 2,3,4,5, and also having couplers 11 interconnecting said portions 10. The couplers 11 are fabricated from the same material as the rectilinear portions 10 of the winding 9 such, for example, as copper. In FIG. 2 the sections of the phase A are shown with a dashed line. A liquid metal enclosed in a ceramic tube 13 is used as a secondary element 12.

The proposed polyphase winding 9 permits a decrease in expenditure of electrically conductive materials for end joints. The winding 9 may be connected to a polyphase power line by any known method.

Figure 3:
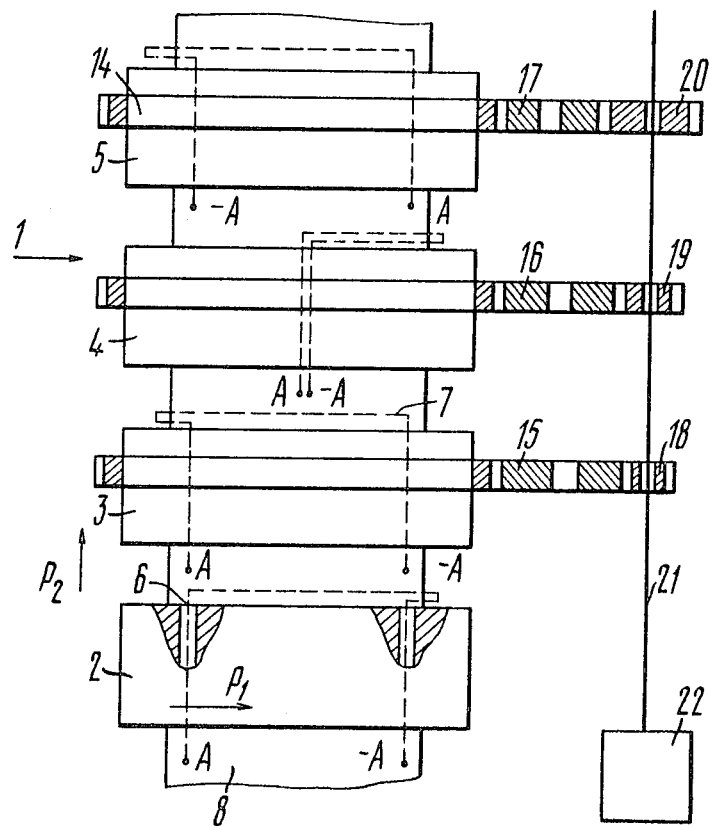
FIG. 3 is a top view (with a partial section) of a cylindrical linear induction motor having a control system adapted to control its traction force, according to the invention.

The motor of the invention in FIG. 3 has a control system adapted to control its traction force, which system comprises indentical drive gearwheels 14 (FIG. 3) sitting on respective circular cores 3,4,5. Driven gearwheels 14 cooperate with intermediate gearwheels 15, 16, 17 which in turn cooperate with driving gearwheels 18,19,20. The driving gearwheels 18,19,20 are set on a single shaft 21 which is rotated by a step electric motor 22.

The diameters of the driving gearwheels 18,19,20 are related to one another as the numbers included in a natural numerical series, beginning with unity, and the diameter of the driving gearwheel 18 cooperating with the driven gearwheel 14 set on the core 3 juxtaposed to the outermost core 2 is selected to be equal to unity. In the described embodiment, the diameters of the driving gearwheels 18,19,20 are related to one another according to a ratio 1:2:3.

The diameters of the intermediate gearwheels 15,16,17 are selected in a manner that the driving gearwheels 18,19,20 and the driven gearwheels 14 are aligned.

In FIG. 3 a dashed line is used to show diagrammatically the phase A of the polyphase winding 7.

Figure 4:
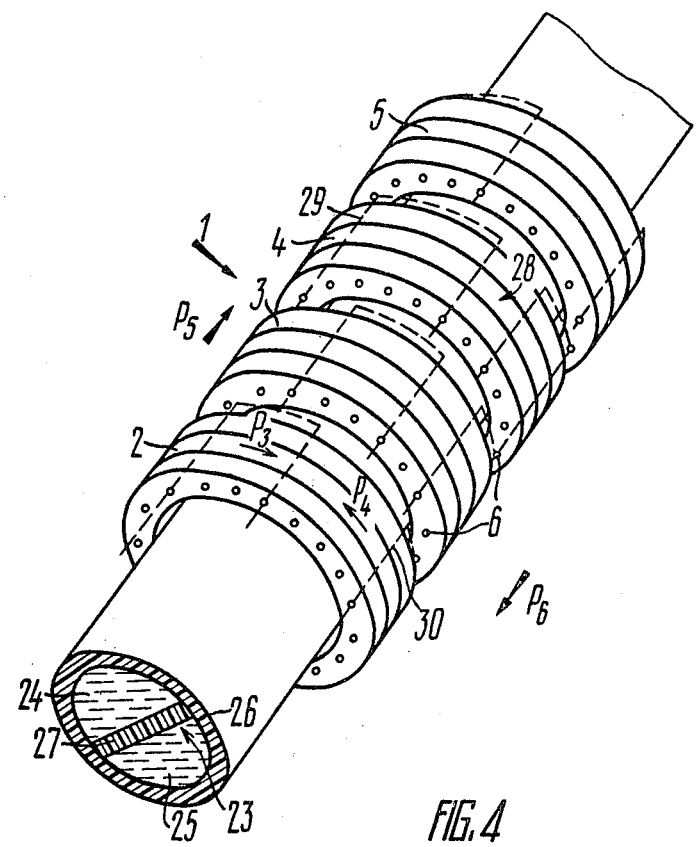
FIG. 4 is a general view in perspective of a cylindrical linear induction motor having a secondary element including two different electrically conductive liquids, according to the invention.

According to another version of the motor of the invention, a secondary element 23 (FIG. 4) comprises two different electrically conductive liquids 24,25 contained in a cylindrical shell 26 made of a non-magnetic dielectric material such, for example, as ceramics, said shell 26 having a diametrically arranged partition 27 adapted to form respective cavities for the liquids 24,25.

A polyphase winding 28 comprises two winding portions 29, 30. The winding portion 29 contained in the slots 6 of the cores 2,3,4,5 of the inductor 1, which are juxtaposed to the external surface of one of the cavities (the upper cavity according to the described embodiment), is adapted to provide for a direct order of phase sequence, designated ABC, ABC and so forth as related to each of the cores 2,3,4,5 in clockwise direction, and CABC in the direction of movement of the secondary element 23.

The winding portion 30 of the polyphase winding 28 contained in the slots 6 of the cores 2,3,4,5, which are juxtaposed to the external surface of the other cavity (the lower cavity according to the described embodiment), is adapted to provide for a reverse phase sequence, designated ACB,ACB and so forth as related to each of the cores 2,3,4,5 in clockwise direction, and CBAC in the direction of movement of the secondary element 23. A dashed line is used to show the phase A of the winding 28.

The motor of the invention operates in the following manner. Connecting the windings 7,9 (FIGS. 1,2,3) of the inductor 1 to a three-phase power source (not shown) sets up a rotary magnetic field, $P_1$ in the cores 2,3,4,5. This field shown with an arrow in the drawing induces electromotive forces in the secondary element 8,12 causing currents to flow therethrough. The interaction of these currents with the rotary magnetic field, $P_1$, produces a torque causing the secondary element 8,12 to rotate about its axis.

A travelling magnetic field, $P_2$, shown with an arrow in the drawing is established along the motor axis under the action of the magnetizing force of the windings 7,9 in the entire system of the cores 2,3,4,5 of the inductor 1. Crossing the secondary element 8,12 the travelling magnetic field, $P_2$, induces therein electromotive forces causing a current flow. The interaction of the currents flowing through the secondary element 8,12 with the travelling magnetic field, $P_2$, produces an axial force causing the secondary element 8,12 to perform a progressive motion.

The sum action of the torque and the axial force permits a progressive screw-like motion of the secondry element 8,12.

The value of the axial forces resulting in a progressive motion of the secondary element 8 (FIG. 3) of the motor depends on a displacement of the slots 6 of like phases of the polyphase windings 7 of adjacent cores 2 and 3, 3 and 4, 4 and 5. If such a displacement is unavailable, which means that like phases are arranged in an axial direction in succession, then the axial force coinciding with the direction of progressive motion of the secondary element 8 is equal to zero, and the latter is subject to a rotational motion only. When a displacement of the slots 6 of like phases of the polyphase windings 7 of adjacent cores 2 and 3, 3 and 4, 4 and 5 tends to increase in a range from 0° to 180°, the axial force in the direction of progressive motion of the secondary element 8 increases and, after reaching a maximal value, decreases. In the case of the mutual position of the cores 2, 3, 4, 5 characterized by a 180° displacement between adjacent cores 2 and 3, 3 and 4, 4 and 5, the axial force coinciding with the above-mentioned direction becomes equal to zero. If the relative angle of rotation of two adjacent cores of the cores 2,3,4,5 varies within a range from 180° to 360°, there result axial traction forces of an opposite direction.

When the step motor 22 is energized, usually for a short time interval, its shaft is given a rotation. Under the action of respective gearwheels, the core 3 rotates by a certain angle, while the rotation of the cores 4 and 5 exceeds that angle by a factor of 2 and 3, respectively. The angle between adjacent cores 2 and 3, 3 and 4, 4 and 5 has been changed as compared to that available prior to energization of the step motor 22, but will be the same for each of said pairs. A change in the displacement between adjacent cores 2 and 3, 3 and 4, 4 and 5 results in a variation of the traction force in the direction of progressive motion of the secondary element 8.

When the tree-phase winding 28 (FIG. 4) of the motor is coupled to a voltage source, there results a variable magnetic field. Within the winding portion 29 of the polyphase winding 28 said field is represente by a magnetic field, $P_3$, which travels over the circle arcs in the cores 2,3,4,5, and within the winding portion 30 of the winding 28 said field is represented by a travelling magnetic field, $P_4$, opposite to the field $P_3$. The winding portion 29 of the winding 28 provides for a direct order of phase sequence in the direction of the motor axis and forms a magnetic field, $P_5$, following said direction. On the other hand, the winding portion 30 provides for a reverse order of phase sequence in the direction of the motor axis and forms a magnetic field, $P_6$, opposite to the field $P_5$.

The magnetic fields $P_5$, $P_6$ interact with the currents so induced and forces are produced within the liquids 24,25 of the secondary element 23 which serves to mix these liquids in respective cavities of the shell 26 and to pump them in accordance with the direction of the fields $P_5$, $P_6$.

The circular cores 2 provide for an increase in the area of active interaction of the inductor 1 and the secondary element 5, 9. As a result, the torque and the axial traction force tend to increase and the motor of the invention offers greater effectiveness.

Since the force of interaction between the inductor and the secondary element is increased and a system to control the traction force in the direction of movement is available, the motor of the invention provides for greater efficiency of drilling and boring installations. In the case of pumping and mixing electrically conductive liquids, their quality becomes better without employment of auxiliary means.

What is claimed is:
1. A cylindrical linear induction motor, comprising:
   an inductor;
   a secondary element made of electrically conductive material and surrounded by said inductor;
   a laminated core structure of said inductor;
   cores of circular configuration forming said laminated core structure and having slots arranged on the internal surface of said cores;
   a polyphase winding of said inductor contained in said slots, the slots for like phases of adjacent ones of said cores being displaced by a distance equal to or greater than a distance between adjacent ones of said slots of one of said cores.

2. A motor as claimed in claim 1, wherein said multiphase winding includes individual sections having rectilinear portions contained in said slots of said circular cores, and couplers interconnecting said portions.

3. A motor as claimed in claim 1, comprising:
   a control system to control the traction force of the motor;
   identical driven gearhwheels of said control system sitting on respective ones of said circular cores, except one of the outermost cores;
   intermediate gearwheels of said control system cooperating with said driven gearwheels;
   driving gearwheels of said control system having a common shaft and cooperating with said intermediate gearwheels, the diameters of said driving gearwheels being related to one another as the numerals included in a natural numerical series, beginning with unity, the diameter of one of said driving gearwheels cooperating with one of said driven gearwheels sitting on one of said cores juxtaposed to said outermost cores being selected to be equal to unity;

a step motor of said control system, adapted to drive said driving gearwheels.

4. A motor as claimed in claim 1, comprising:
said secondary element including two different electrically conductive liquids;
a cylindrical shell made of non-magnetic dielectric material and provided with a diametrically arranged partition forming two cavities for said liquids;
said polyphase winding including two winding portions, a first one of said two winding portions contained in said slots of said circular cores, which are juxtaposed to the external surface of a first one of said cavities of said cylindrical shell, adapted to provide a direct order of phase sequence as related to each of said cores and to the motor axis, and a second one of said winding portions contained in said slots of said circular cores, which are juxtaposed to the external surface of a second one of said cavities, adapted to provide for a reverse order of phase sequence as related to each of said cores and to the motor axis.

* * * * *